United States Patent [19]

Sirat

[11] Patent Number: 5,267,165
[45] Date of Patent: Nov. 30, 1993

[54] DATA PROCESSING DEVICE AND METHOD FOR SELECTING DATA WORDS CONTAINED IN A DICTIONARY

[75] Inventor: Jacques A. Sirat, Limeil-Brevannes, France

[73] Assignee: U.S. Philips Corporation, New York, N.Y.

[21] Appl. No.: 669,155

[22] Filed: Mar. 14, 1991

[30] Foreign Application Priority Data

Mar. 20, 1990 [FR] France ................... 90 03539

[51] Int. Cl.$^5$ ............................. G06F 15/20
[52] U.S. Cl. ............................. 364/419.11
[58] Field of Search ........................ 364/419

[56] References Cited

U.S. PATENT DOCUMENTS

| 4,771,385 | 9/1988 | Egami et al. | 364/419 |
| 4,799,188 | 1/1989 | Yoshimura | 364/419 |
| 4,862,408 | 8/1989 | Zamora | 364/419 |
| 4,903,206 | 2/1990 | Itoh et al. | 364/419 |
| 5,109,509 | 4/1992 | Katayama et al. | 364/419 |
| 5,113,340 | 5/1992 | McWherter | 364/419 |

OTHER PUBLICATIONS

R. P. Lippmann, "Pattern Classification Using Neural Networks", IEEE Communications Magazine, Nov. 1989, pp. 47-64.
C. L. Yeh, "Delayed-Desicison Binary Tree-Searched Vector Quantization for Image Compression", SPIE, vol. 1099, Advance in Image Compression and Automatic Target Recognition (1989), pp. 154-158.
R. P. Lippmann, "An Introduction to Computing with Neural Nets", IEEE ASSP Magazine, Apr. 1987, pp. 4-22.
E. Diday et al., "Elements d'Analyse de Donnees", Editeur Dunod (1982), pp. 167, ff.
A. Aho et al, *Principles of Compiler Design*, (Addison-Wesley 1977) pp. 340-341.
P. Lockwood, "Acces Rapide dans un Dictionnaire de Mots", Séme Congrès Reconnaisance des formes et intelligence artificielle, Grenoble (Nov. 27-29, 1985) Tome II, pp. 975-82.

*Primary Examiner*—Robert A. Weinhardt
*Attorney, Agent, or Firm*—Anne E. Barschall

[57] ABSTRACT

A data processing device for selecting data words which are contained in a dictionary and which are nearest to a data word to be processed according to a correspondence criterion. The device includes: first apparatus for segmenting the space enclosing the assembly of data words of the dictionary; second apparatus for generating, for each segment, sub-dictionaries by making an arbitrary segment correspond, in accordance with the correspondence criterion, to words of a sub-dictionary; third apparatus for utilising the sub-dictionaries by determining, for an arbitrary data word to be processed, the segment with which it is associated, followed by determination, in accordance with the correspondence criterion, of that word or words among the words of the sub-dictionary associated with the segment which corresponds (correspond) best to the arbitrary data word to be processed. Segmentation can be realised by means of a layered or tree-like neural network. The device may be used for data compression or data classification.

24 Claims, 2 Drawing Sheets

DATA PROCESSING DEVICE AND METHOD FOR SELECTING DATA WORDS CONTAINED IN A DICTIONARY

FIELD OF THE INVENTION

The invention relates to a data processing device containing a plurality of fixed-length exemplary words DR arranged in a multidimensional space and together constituting a dictionary, for upon presentation of a test word DO, in said dictionary selecting one or more corresponding words MS, that according to a predetermined correspondence criterion are closest to said test word DO.

The invention also relates to a method of selecting data words contained in a dictionary.

A device and a method of this kind are used in the compression of information or the classification of data.

BACKGROUND OF THE INVENTION

The methods generally used are based on the search for a word $A^m$ which is nearest to a data word X to be processed. The word $A^m$ belongs to a group of M reference words which are called a dictionary. These words $A^m$ and X generally comprise N components $A_i^m$ (or $X_i$) where $i=1..N$.

The proximity is often evaluated on the basis of a distance criterion $d(A^m,X)$ between the word $A^m$ and the word X. When the components are numbers, for example the euclidean distance can be taken:

$$d(A^m,X) = \sum_{i=1}^{N} (A_i^m - X_i)^2$$

Thus, it is necessary to determine the word $A^{m1}$ for which the distance from the data word X is minimum. Thus, for any word $A^m$ of the dictionary it is necessary that:

$$d(A^{m1},X) \leq d(A^m,X)$$

It is not only possible to determine the one nearest word $A^{m1}$, but also the K words $A^{m1}, A^{m2}, \ldots, A^{mK}$ which are nearest with respect to a predetermined proximity limit. The search may be terminated, either when a sufficient number of corresponding words has been found or when all corresponding words have been found that correspond better than or at least as well as according to a correspondence limit.

The method currently used for the determination of the nearest word or words consists in the execution of a complete calculation of all distances between a data word and all respective words of the dictionary, followed by a search for the smallest distance or distances by way of a comparison operation. Such an operation enables an error-free result to be obtained. However, it is very costly in terms of calculation time, i.e. mainly for the calculation of all distances when the dictionary contains many words.

Various proposals have been made for reducing this calculation duration, but generally they all lead to either the introduction of errors or the imposition of constraints as regards the dictionary. A relevant reference is: "Delayed-decision binary tree-searched vector quantization for image compression" by CHIA LUNG YEH, SPIE Vol. 1989, pp. 154-158. The document proposes the execution of a tree-search on the words of the dictionary by examining several branches of said tree simultaneously. This method determines a code with few errors when the number of branches examined is large, but requires a long calculation time.

The problem to be solved, therefore, is the selection of the word or words of the dictionary which is or are nearest to a data word to be analysed, notably by reducing the duration of processing. It should be possible to carry out this operation with an arbitrarily low error rate.

SUMMARY OF THE INVENTION

According to one of its aspects, the object is realized by first means (20) for meshing (netting) said multidimensional space whereby each exemplary word is either within one mesh or on a boundary between neighbouring meshes, second means (24, 25) for assigning to each mesh a respective sub-dictionary that contains any word among said exemplary words that according to said correspondence criterion would correspond to at least one word, fiduciary or exemplary, assigned to the latter mesh;

third means for assigning said test word DO to any particular mesh to which it belongs and thereupon applying said correspondence criterion exclusively to the exemplary words of the sub-dictionary of said any particular mesh.

The solution may also be formed by a programmed device, for example a computer. In that case the device is characterized in that said device comprises preprogrammed means for successively:

firstly, meshing (netting) said multidimensional space (20) whereby each exemplary word is assigned to at least one mesh;

secondly, assigning (24, 25) to each mesh a respective sub-dictionary that contains any word among said exemplary words, that according to said correspondence criterion would correspond to at least one word, fiduciary or exemplary, assigned to the latter mesh;

thirdly, assigning said test word DO to any particular mesh to which it belongs and thereupon applying said correspondence criterion exclusively to the exemplary words in the sub-dictionary of said any particular mesh.

The assignment of all exemplary words of the dictionary to one or more sub-dictionaries each associated with a respective maze of the mesh allows for a substantial reduction of the calculation time during the examination of an arbitary data word to be processed. An arbitrarily small error rate can be achieved by the choice of the dimensions of the segments and the number of test samples.

The data words of the dictionary constitute an assembly which is partitioned by segmentation of the space enclosing this assembly. This segmentation can be realised by means of separators. In accordance with the invention, these separators are preferably generated by a neural network. It may concern a layered neural network or a tree-like neural work. However, it is alternatively possible for these separators to be determined on the basis of a programmed logic array (PLA) or on the basis of combinatory logic.

In the preferred case involving a neural network, the phase for positioning the separators (i.e. the segmentation phase) is carried out during a learning phase. The neural networks are formed by elements which are referred to as neurons and which realise a function in the input space.

Generally speaking, such function is given by:

$$V = f \sum_{j=1}^{N} C_j \cdot X_j$$

where $X_j$ is the component of the order j of the data element $X_j$, $C_j$ is the component of the order j of the synaptic vector C, N is the dimension of the space of the data X, f is a generally non-linear function, proper to the neuron in question.

In accordance with the invention, the function f is preferably of the staircase type, i.e. it is constant per intervals, for example $f(u)=i$ for $a_i < u \leq a_{i+1}$, where $i=0..L-1$, where $a_0 = -\infty < a_1 < a_2 < \ldots < a_{L-1} < a_L = +\infty$.

The neurons may be organised in a layered neural network or in a neutron tree.

In a layered neural network, a successive calculation takes place of all neurons of a given layer whose respective outputs V constitute the inputs of the next layer. Several successive layers can also be formed.

In a neural network one distinguishes the learning phase from the user phase. The learning phase implies calculation of all neuron states in order to position the separators and to determine the number of neurons necessary for the intended task. However, for a tree-like neuron network, all neuron states are no longer calculated for the user phase, but only a limited number which depends on the value of the output of the preceding neuron.

The end of the learning phase occurs when all layers of the layered neural network have their synaptic coefficients calculated or when it is no longer necessary to calculate a subsequent neuron in a tree-like neural network. Because the output states $V_j$, $j=1..r$, assume a limited group of values, a distribution (segmentation) of the data space into a limited number of sub-groups (segments) is obtained. This distribution will be learned by one of the neural networks in the form of synaptic coefficients so generated. Therefore, during the learning phase the network is presented with a series of examples for which the output results is known in advance. Preferably, the examples chosen are words of the dictionary. However, it is also possible to choose examples of data which do not form part of the dictionary but for which the nearest word of the dictionary is known in advance. The learning process consists in the assigning of data examples according to the nearest dictionary word. Numerous learning algorithms and are known to those skilled in the art. For example, reference is made to the article by R. P. LIPPMANN "An introduction to computing with neural nets", IEEE ASSP Magazine, April 1987, pp. 4-22.

The data words introduced into the neural network may be either canonical (non-prepared) words or prepared words. Thus, for example in image processing the data words may define a characteristic of a sequence of pixels: luminosity, contrast, ... For the processing of an acoustic signal, the data words may be formed by a sequence of samples relating to a time characteristic, frequency characteristic, etc. The situation is analogous for data word classification problems. Canonical coordinates of such canonical data words may be directly introduced into the neural network. However, it is also possible to consider the distribution (in a mathematical sense) formed by these data words and to prepare these data as a function of the characteristics of said distribution of the assembly of data relating to the problem to be treated. Thus, for example it is possible to perform an analysis into principal components of the whole distribution or a part of the distribution of the words of the dictionary, and to choose coordinate axes adapted to this distribution in order to prepare the data words and use a principal coordinate of the distribution. Several data preparation operations can be performed by performing analysis into successive principle components on parts of the data distribution, said parts being obtained in the course of the learning process.

The analysis into principal components is a statistical method which enables an assembly of N vectors $\vec{y}^\mu$ (points in a d-dimensional space) to be described by means of a mean vector $$<\vec{y}> = \frac{1}{N} \sum_\mu y^\mu$$

of d principal directions and the d corresponding variances $\sigma^2$. The method is described in detail in "Elé ments d'Analyse de Données" by E. DIDAY, J. LEMAIRE, J. POUGET, E. TESTU, Editeur Dunod (1982), page 167, ff.

The function f may be fixed for each neuron or be adapted as determined by the words of the dictionary. The learning phase enables calculation of the synaptic coefficients and determination of the function (functions) f so that each partition, that is to say each segment of the dictionary as determined by the outputs of the neurons considered, enclosed relatively few words of the dictionary.

For performing the learning operation a plural-layered network can be used and a particular intermediate layer H can be examined for the forming of the segments. This allows for an increased number of segments, because the number of segments effectively used increases as the first layer is approached.

When the segmentation has been performed, the sub-dictionaries relating to each segment are determined, i.e. for each output state of the neural network. The sub-dictionaries are formed by accumulating for each segment the results obtained by presentation of a sequence of examples $X^p$:

an assembly of examples $X^p$ to be tested is chosen for which the solution is known, that is to say for which the K nearest words $A^{m1(p)}$, $A^{m2(p)}$, ..., $A^{mK(p)}$ of the dictionary are known;

the output state of the network $V_1(p)$, $V_2(p)$, ..., $V_r(p)$ which characterizes a particular segment is determined for each example $X^p$, thus defining the assignment of the examples $X^p$ to said segment;

the sub-dictionary of each segment is formed by accumulating the words $A^{m1(p)}$, $A^{m2(p)}$, ..., $A^{mK(p)}$ associated with each segment.

These sub-dictionaries can be stored in memories which each are addressed by the respective associated output state of the neural network.

By increasing the number of test examples, the error rate occurring during the subsequent user phase decreases. This rate can thus be made arbitrarily low.

After the neural network has learned its segmentation and the subdictionaries associated with each segment have been determined, the neural network can operate in the user phase on the test data words to be processed.

To this end, the data word X to be processed is introduced into the neural network whose output delivers a configuration of output stages $V_1, \ldots, V_r$. This configuration enables determination of the relevant sub-dictionary for the processing of the data word X.

The correspondence criterion is then exhaustively determined for all words of this sub-dictionary $A^{m1}$, $A^{m2}, \ldots, A^{mK}$ in order to calculate the correspondence between the data word X to be processed and each of the words of the sub-dictionary. This correspondence may be characterized as a distance or a similarity.

For a data word to be processed the calculation of the correspondence during the user phase is thus advantageously limited to the consideration of exclusively the words of the sub-dictionary whereto it relates. No restriction whatsoever is imposed as regards the dictionary.

The invention also characterizes a method of selecting data words contained in a dictionary, which method can be carried out by an appropriately programmed computer.

The method is characterized by the following steps:
a first step for segmenting the space enclosing the data words of the dictionary,
a second step for generating sub-dictionaries, including the establishment of correspondence, in accordance with a predetermined correspondence criterion, between given words of the dictionary and each segment in order to form the words of the sub-dictionaries associated with each segment,
a third step for the use of the sub-dictionaries by determining, for an arbitrary data word to be processed, its association with a segment and by subsequently determining, in accordance with said correspondence criterion, that word or words among the words of the sub-dictionary associated with said segment which corresponds (correspond) best to said arbitrary data word to be processed.

According to a further version of the invention, it is also possible to use pre-established sub-dictionaries with which the words of the dictionary are already associated. The neural network then serves to directly perform the selection of the appropriate sub-dictionary. The device in accordance with the invention in that case comprises a neural network which addresses the sub-dictionaries determined by each data word to be processed and means for determining, among the words of the addressed memory, that word or those words which corresponds (correspond) best to said arbitrary data word to be processed. The neural network may either have a tree-like organisation or a layered organisation.

Applications of a device or method in accordance with the invention are in the field of data compression for the processing of images or acoustic or other signals or in the field of data classification, and processing time is shortened appreciably. The relevant hardware is also simplified.

BRIEF DESCRIPTION OF THE DRAWINGS

The invention will be described in detail hereinafter with reference to the accompanying drawing; therein.

DESCRIPTION OF EMBODIMENTS

Figure 1:
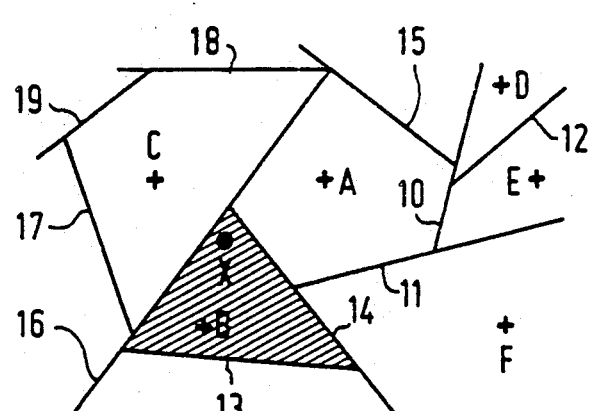
FIG. 1 shows an example of the segmentation of the data space in a two-dimensional representation.

FIG. 1 shows an example of the segmentation of the data space in a two-dimensional representation. During the learning phase, the neural network determines its synaptic coefficients in order to place separators 10 to 19 forming said segmentation. Each segment will enclose one or more words of the dictionary, for example the words A, B, C, D, E, F.

Figure 2A:
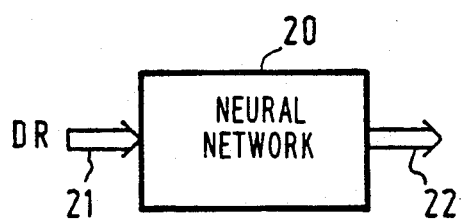
FIG. 2A shows a diagram illustrating the segmentation by means of a neural network.
Figure 2B:
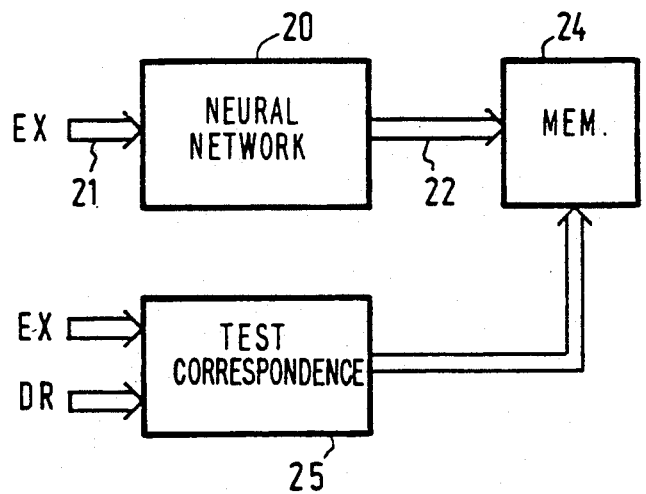
FIG. 2B shows a diagram illustrating the formation of the sub-dictionaries.
Figure 2C:
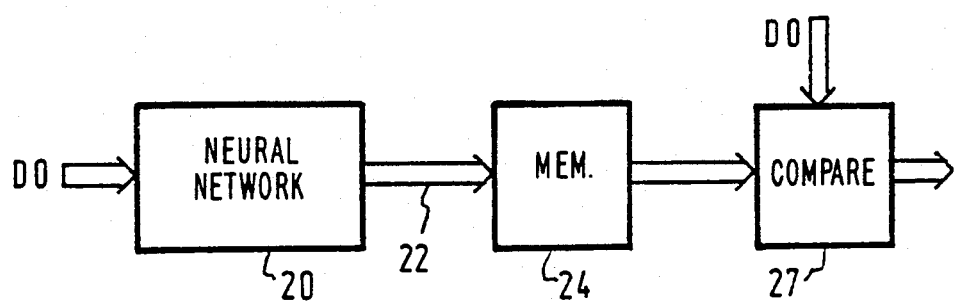
FIG. 2C shows a diagram illustrating the use of the sub-dictionaries.
Figure 3A:
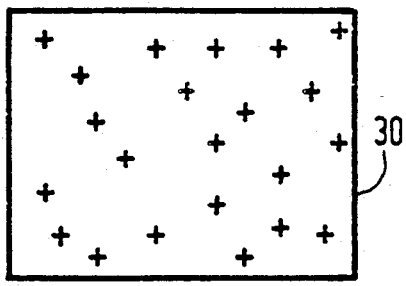
FIGS. 3A-3E illustrate the formation of a sub-dictionary.
Figure 3B:
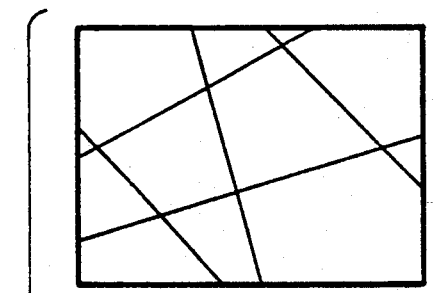
Figure 3C:
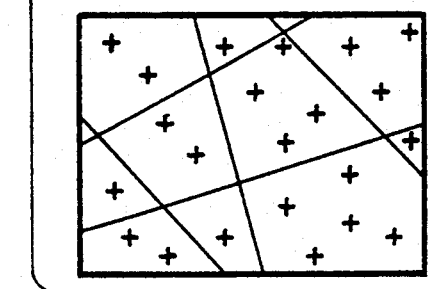

FIGS. 2A-2C are diagrams of an apparatus for implementing the invention. FIGS. 3A-3E illustrate the formation of a sub-dictionary. For better clarity, first the latter Figures are now treated in detail. First, FIG. 3A shows dictionary words, each represented by a cross, within a rectangle 30 that represents the whole space or a part thereof, wherein the dictionary has been defined. For clarity, a two-dimensional space has been chosen but the actual number of dimensions in practice may be much higher. Now the first operational step consists in meshing or netting the operational space. This is effected by positioning a plurality of hyperplanes in the multi-dimensional space, each such hyperplane forming a separator. Generally, the dimensionality of such hyperplane is one lower than the dimensionality of the space. In two-dimensional space they are lines, in three-dimensional space, planes, etc. The separators are shown in FIG. 3B, the mapping of the dictionary words on the meshed multi-dimensional space in FIG. 3C. Each dictionary word is shown to be inside a particular maze of the mesh. Alternatively, such dictionary word may be positioned exactly on one of the separators, or even on one or more intersecting separators.

The second step of the process consists in assigning to each respective maze (or mesh) a part of the words of the dictionary in general. In particular, all words are of uniform length. The assigning is effected on the basis of a correspondence criterion. For simplicity, first as correspondence criterion the distance between nearest neighbours is taken. Now, for example, the mesh mnpq contains dictionary words C, D. However, during the processing of a test word, the later could be found lying anywhere inside mesh mnpq (or even on one of its boundaries, which could also be the case for one or more of the dictionary words, but which has not been shown for simplicity). This means that in practice, the closest neighbour(s) of such test word among the dictionary words could by inside mesh mnpq as well as outside it. For finding the dictionary word best corresponding to a test word that itself could have been a dictionary word assigned to mesh mnpq, it is thus necessary to take also dictionary words into account that are situated outside mesh mnpq. In the example, to this effect words A, B, E, F, G, have been taken; these are the best corresponding dictionary words each to one or more words inside mesh mnpq but which have not included in the dictionary as exemplary words and are thus called fiduciary words. In consequence, there is assigned to mesh mnpq a sub-dictionary constituted by words A, B, C, D, E, F, G. The same process is executed for each one of the several meshes. So, for correctly determining the one exemplary word obeying best to the test word in question all exemplary words outside the mesh in question should be assigned to the mesh' dictionary if themselves they are the one most closely corresponding word to a word that could belong to the mesh. If the two best corresponding dictionary words should be found, always the two best corresponding dictionary words for each actual or fiduciary word inside the mesh should be assigned to the sub-dictionary in question. For other cases, even more dictionary words could be assigned, such as when a variable number of dictionary words should be assigned to a test word. In the above cases, the minimum sub-dictionary has been specified. It may always be extended to comprise more dictionary words. Further, the correspondence criterion may be expressed as being a maximum allowable distance to a test word. In that case, the correspondence criterion for assigning the exemplary words to a particular mesh's sub-dictionary would also be the same maximum distance (or a larger one) to any possible word assignable to the mesh itself.

Figure 3D:
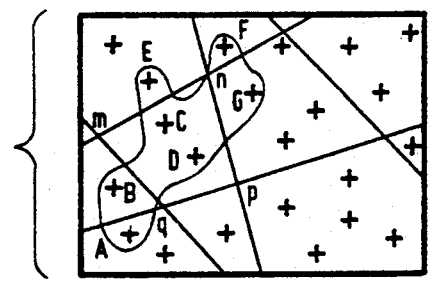
Figure 3E:
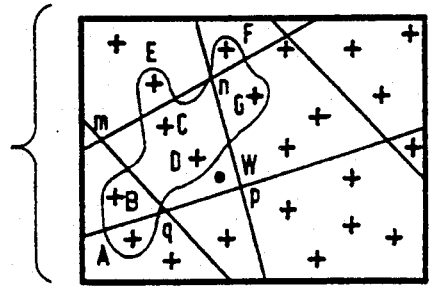

A particular property of the above method is that the sub-dictionary is created independently of future test words. FIG. 3D shows the assigning of words to the sub-dictionary of mesh mnpq. For clarity, an arbitrary contour has been shown that encompasses all exemplary words of the sub-dictionary but no others. The shape of the contour is inconsequential.

During the processing of an unknown word W (FIG. 3E) first it is determined within which mesh it belongs, here mesh mnpq. Next, only the words of the sub-dictionary of mesh mnpq need to be checked against the correspondence criterion. Obviously checking only the words of one sub-dictionary is much easier and/or faster than checking of all dictionary words would be. From FIG. 3F it is clear that within the sub-dictionary, word D has the best correspondence to word W.

FIG. 2A shows in the form of a symbolic block a neural network 20 whose inputs 21 receive the words DR of the dictionary. Its outputs 22 supply output states whose various configurations each identify one segment of the input data word space. The neural network serves to position separators according to the learning method known to those skilled in the art. Thus, for example for the learning of a layered neural network it is possible to use the known error back-propagation method which consists of the presentation of examples to the input for which the output results are known in advance (nearest dictionary word $A^{m1}$) and back propagation of the errors in the neural network. The learning then consists of the calculation of the synaptic coefficients of the neural network in order to ensure that the results which are known in advance are effectively obtained at the output of the neural network. Information in this respect is given in the article by R. P. LIPPMANN, "An introduction to computing with neural nets", IEEE ASSP Magazine, April 1987, pp. 4–22.

It is also possible to use tree-line neural networks, for example the networks described in the article by R. P. LIPPMANN "Pattern classification using neural networks", IEEE COM Magazine, November 1989, pp. 47–64. The neural network is in that case constructed so that the number of neurons as well as the synaptic coefficients are adapted to the function to be learned. The advantage of the use of a tree-like neural network resides in the fact that not only the number of neurons to be used is smaller than the number of neurons in a layered neural network, but above all in the fact that in the user mode not all neuron states are calculated but only those of the branches of the tree which are involved in the relevant task.

Preferably, in accordance with the invention learning is performed in order to ensure that each segment of the dictionary has exactly one date word. Alternatively, a segment may enclose several words of the dictionary.

When segmentation has been performed, the device must generate the sub-dictionaries. The diagram of FIG. 2B is an example of such generation. To this end, use is made of examples of data words EX which differ from the data words of the dictionary. These examples EX are distributed at random in the various segments of the input space. These examples EX are introduced into the neural network 20 and produce output state configurations on the output which serve to address, for example a memory 24. These examples EX and the words of the dictionary DR are introduced into an element 25 which tests the correspondence criterion. This correspondence criterion can determine a distance or a similarity between two data. This is, for example, the euclidean distance: $d(DR,EX)=(DR-EX)^2$ The distances between a given example EX and all respective words DR of the dictionary are then calculated. Depending on the predetermined desired correspondence, given words of the dictionary are chosen as explained supra to form the sub-dictionary assigned to the output state configuration (that is to say to the segment) relating to the example processed. This sub-dictionary is stored in the memory 24.

This predetermined correspondence may be the selection of the nearest neighbours or the neighbours showing best resemblance or an other characteristic.

Because operation takes place on a large number of examples, sub-dictionaries are thus obtained which are associated with each segment and which are sufficiently numerous, thanks to the number of segments and the number of examples EX, to enable reduction of the errors in the user mode. The error rates can thus be reduced to an arbitrarily small value by using a large number of examples EX. No restriction whatsoever is imposed as regards the dictionary itself.

When the sub-dictionaries have been formed, the device can be used so as to operate with data words DO to be processed (FIG. 2C). These data words DO are introduced into the neural network 20 and produce, on the output 22, an output state configuration which addresses the memory 24. The latter delivers the words of the sub-dictionary associated with the addressed segment. A member 27, which may be the already described member 25, determines the state of correspondence between the data word DO and the words of the addressed sub-dictionary. This determination, therefore, is performed on the very limited number of words of the sub-dictionary, offering a substantial gain in processing time.

Let us consider the data word X to be processed which is situated in the hatched cell of FIG. 1. Its addressed sub-dictionary comprises, for example the words A, B, C (no relation to A ... in FIG. 3D,E) and not the words D, E, F, because they are too remote from the cell. The calculation of the correspondence will thus be realised exclusively for these words of the sub-dictionary.

According to the described embodiment, the neural network serves to generate the sub-dictionaries as well as to select each appropriate sub-dictionary for the processing of a data word in the user mode. When the dictionaries have already been established, either because they have already been identified or because they have already been determined by other approaches, the invention can be limited to the use shown in FIG. 2C. The neural network 20 addressed the memory 24 which delivers the words of the addressed dictionary to the correspondence comparison member 27 which determines the level of correspondence between said words of the addressed dictionary and the input data words DO. The memory 24 may be formed by any addressable member enabling reading of different addressed dictionaries.

I claim:

1. A data processing device for storing and selecting a plurality of fixed length data words DR, the device comprising
   a) means for identifying a mesh within a multidimensional space representation of a dictionary of the data words DR, the identified mesh corresponding to a test word DO, the multidimensional space containing a plurality of meshes, each mesh being assigned at least one of the data words DR, each data word being either: i) within the mesh to which that data word is assigned; or ii) on a boundary between the mesh, to which the data word is assigned, and another mesh;
   b) means for supplying a respective sub-dictionary in response to the identified mesh, the respective sub-dictionary containing all of the data words DR which correspond, according to a correspondence criterion, to those data words DR which are assigned to the identified mesh; and
   c) means for applying said correspondence criterion between the test word DO and the respective sub-dictionary in order to select one or more corresponding words MS, the corresponding words MS being those which are closest to said test word DO in said multidimensional space according to said correspondence criterion.

2. The device of claim 1 wherein the means for identifying is a neural network.

3. A device as claimed in claim 2, characterized in that the neural network is a layered neural network.

4. A device as claimed in claim 2, characterized in that the neural network is a tree-like neural network.

5. The device of claim 2 wherein the neural network has input means for receiving data words and output neurons for supplying output signals having output state configurations specific to each mesh.

6. The device of claim 5 wherein the neural net is trained using the fixed length data words DR and known outputs.

7. The device of claim 5 wherein the means for supplying is a memory addressed by the output signals of the neural network.

8. The device of claim 1 wherein the means for supplying is a memory addressed by output signals from the means for identifying.

9. The device of claim 8 wherein the memory stores a set of sub-dictionaries which encompasses the entire multidimensional space.

10. The device of claim 1 wherein the means for identifying is a programmable logic array.

11. The device of claim 1 wherein the means for identifying is a combinatory logic circuit.

12. The device of claim 1 or 6 wherein the means for identifying responds to data words in the form of signals representing unpreprocessed input vectors.

13. The device of claim 1 or 6 wherein the means for identifying responds to principal components of data or test words which are pre-processed according to a principal component analysis of a distribution of unpreprocessed data words.

14. The device of claim 1 wherein inputs to the means for identifying are signals representing vectors, the multidimensional space is a vector space, and the correspondence criterion is a distance according to a metric defined on the vector space.

15. A device as claimed in any one of the claims 1, characterized in that any correspondence criterion between two words is determined by either a distance or a similarity between the latter two words.

16. A device as claimed in claim 15, characterized in that said correspondence is obtained by determining nearest-neighbours distances between the test word DO and sub-dictionary words SDR of its assigned sub-dictionary.

17. Method for storing and selecting a plurality of fixed length data words DR, the method comprising the following steps
   a) identifying a mesh within a multidimensional space representation of a dictionary of the data words DR, the identified mesh corresponding to a test word DO, the multidimensional space containing a plurality of meshes, each mesh being assigned at least one of the data words DR, each data word being either: i) within the mesh to which that data word is assigned; or ii) on a boundary between the mesh, to which the data word is assigned, and another mesh;
   b) supplying a respective sub-dictionary in response to the identified mesh, the respective sub-dictionary containing all of the data words DR which correspond, according to a correspondence criterion, to those data words DR which are assigned to the identified mesh; and
   c) applying said correspondence criterion between the test word DO and the respective sub-dictionary in order to select one or more corresponding words MS, the corresponding words MS being those which are closest to said test word DO in said multidimensional space according to said correspondence criterion.

18. The method of claim 17 wherein the steps are all performed by a single preprogrammed apparatus.

19. The method of claim 17 wherein the apparatus is a neural network.

20. The method of claim 19 wherein the neural network is a layered neural network.

21. The method of claim 19 wherein the neural network is a tree-like neural network.

22. The method of claim 17 wherein the test word is in the form of signals representing an unpreprocessed input vector.

23. The method of claim 17 wherein the test word is represented according to a principal component analysis of unpreprocessed data words DR.

24. The method of claim 17 wherein the test word is presented in the form of signals representing vectors, the multidimensional space is a vector space, and the correspondence criterion is a distance according to a metric defined on the vector space.

* * * * *